United States Patent [19]

Kovach et al.

[11] Patent Number: 4,949,456
[45] Date of Patent: Aug. 21, 1990

[54] METHOD OF MAKING RING GEAR AND RING GEAR THEREFROM

[75] Inventors: Joseph A. Kovach, Aurora; Dale B. McCartney, Painesville, both of Ohio

[73] Assignee: Eaton Corporation, Cleveland, Ohio

[21] Appl. No.: 453,377

[22] Filed: Nov. 8, 1989

Related U.S. Application Data

[63] Continuation of Ser. No. 294,072, Jan. 6, 1989, abandoned.

[51] Int. Cl.$^5$ ............................................. B23P 17/00
[52] U.S. Cl. .................................. 29/893.35; 29/893.37; 29/DIG. 26; 29/DIG. 49; 51/287; 409/51; 409/52; 74/458
[58] Field of Search ......... 29/159.2, DIG. 19, DIG. 26, 29/DIG. 36, DIG. 49; 51/287, 319, 320; 409/51, 52, 53, 56, 2; 74/458, 462; 72/340, 341; 76/101 R, 101 A

[56] References Cited

U.S. PATENT DOCUMENTS

| 1,486,771 | 3/1924 | Ljungström | 409/56 X |
|---|---|---|---|
| 1,788,639 | 1/1931 | Stonebraker | 409/51 |
| 1,964,233 | 6/1934 | Uhlich | 51/287 |
| 2,195,064 | 3/1940 | Wallace | 29/DIG. 19 X |
| 2,737,855 | 3/1956 | Wenz | 409/52 |
| 2,761,560 | 9/1956 | Pomernacki | 51/287 |
| 3,426,485 | 2/1969 | Yamaoka | 51/287 |
| 4,012,990 | 3/1977 | Wagner | 51/287 X |
| 4,272,927 | 6/1981 | Myers et al. | 76/101 R X |
| 4,548,531 | 10/1985 | Seitelman et al. | 76/101 A X |
| 4,761,867 | 8/1988 | Vollmer et al. | 29/159.2 |
| 4,798,077 | 1/1989 | Douglas | 29/159.2 X |
| 4,805,429 | 2/1989 | Thompson | 51/319 X |

FOREIGN PATENT DOCUMENTS

| 0074462 | 3/1983 | European Pat. Off. | 409/2 |
|---|---|---|---|
| 197114 | 9/1986 | Japan | 409/52 |
| 50041 | 3/1987 | Japan | 29/159.2 |
| 0986658 | 1/1983 | U.S.S.R. | 409/2 |

Primary Examiner—Timothy V. Eley
Assistant Examiner—Frances Chin
Attorney, Agent, or Firm—A. E. Chrow

[57] ABSTRACT

An improved method is provided for finish machining forged and/or rough-cut teeth (8) of a ring gear (40) by which a rotary tool such as a rotary carbide milling tool (24) is rotated about a rotational axis "r" that projectionally intersects a bottom surface (12) of tooth (8) as it tracks along a predetermined tool path enabling the rotary tool to be in close proximity to sidewalls (14 and 14') of teeth (8) and thereby eliminating the practice of having to normalize the ring gear microstructure prior to machining teeth (8).

19 Claims, 3 Drawing Sheets

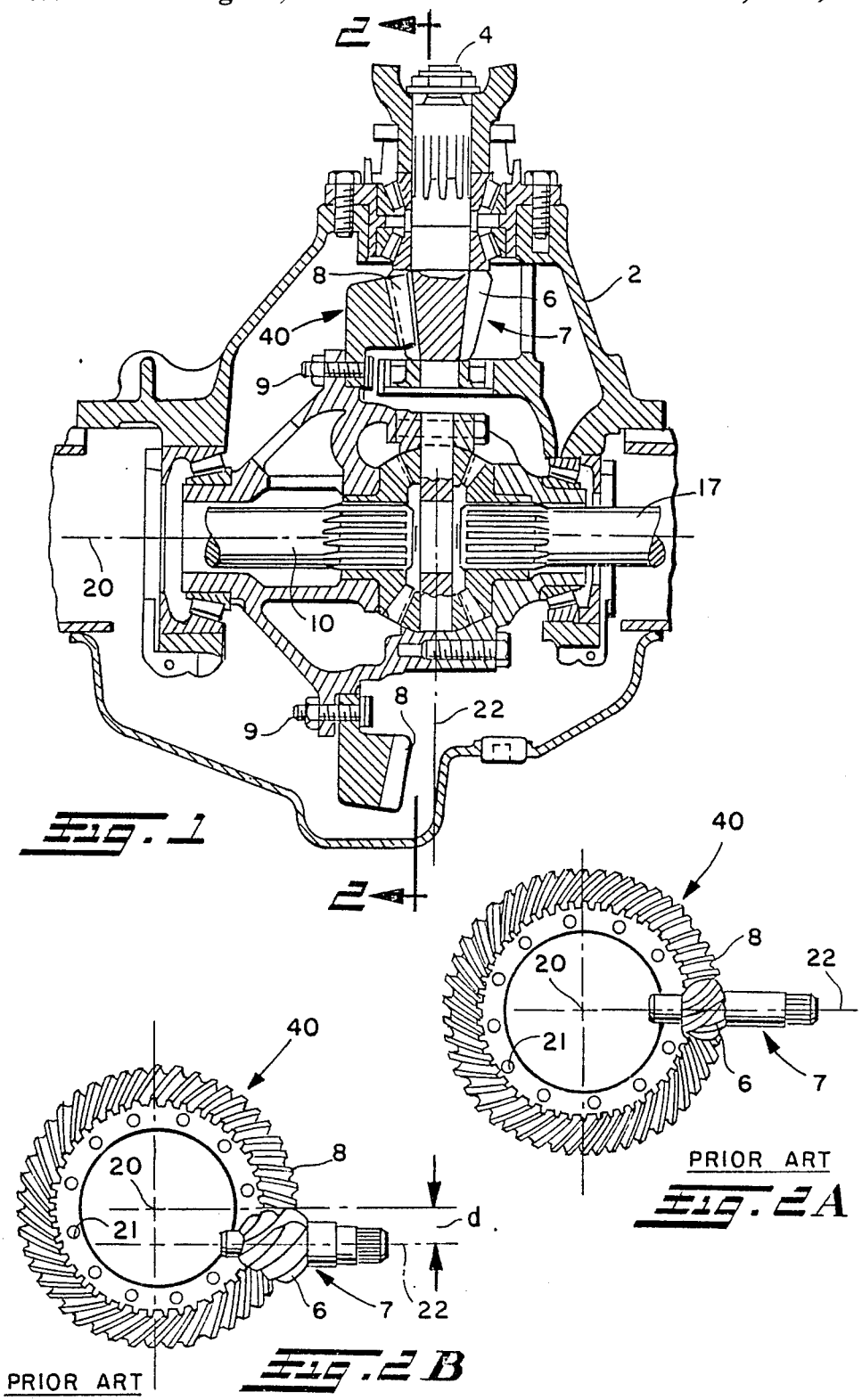

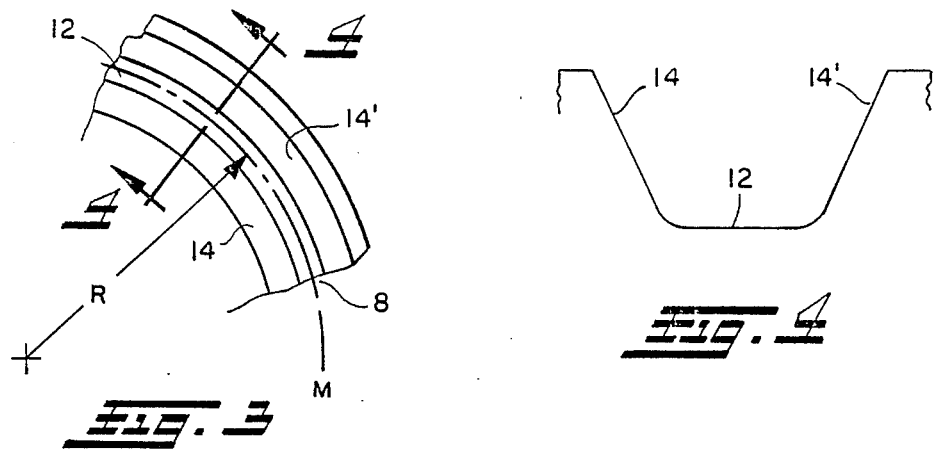
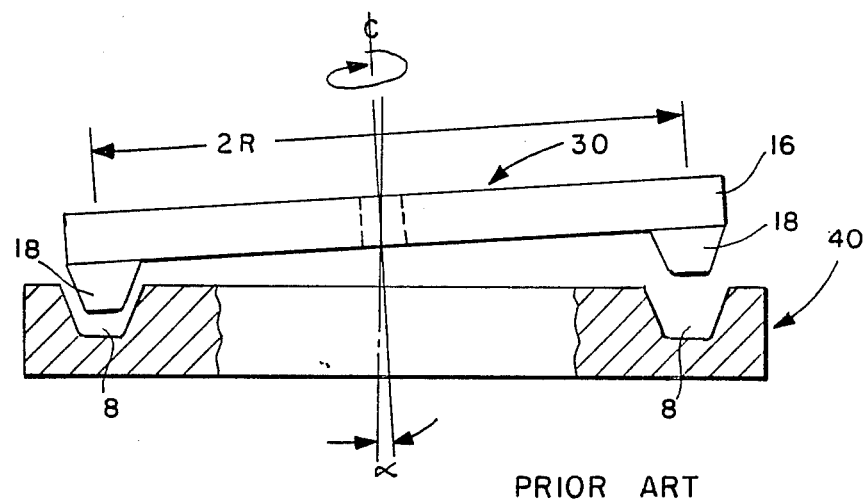
PRIOR ART
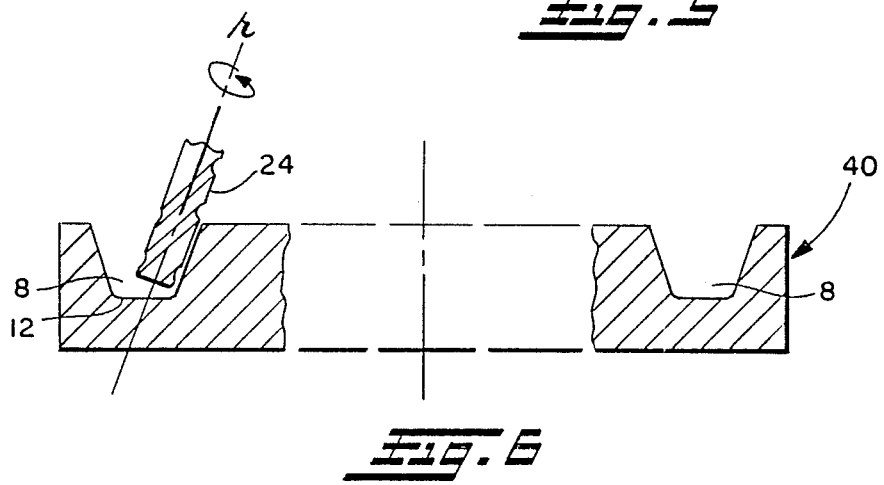

METHOD OF MAKING RING GEAR AND RING GEAR THEREFROM

This is a continuation of Ser. No. 294,072, filed 1-06-89, now abandoned.

INTRODUCTION

This invention relates generally to an improved method for making a ring gear and more particularly to an improved method for making a ring gear having forged and/or rough-cut teeth that are machined by a rotary tool in a manner that advantageously eliminates the need to normalize or otherwise modify the microstructure of the metal from which the ring gear is made.

BACKGROUND OF THE INVENTION

Ring gears have long been used in vehicle differentials for transferring torque to a wheel axle from a rotating drive shaft and commonly have pitch diameters ranging up to 18 inches or more in heavy duty truck differentials.

Due to characteristically large size and the criticality of such application, ring gears are commonly forged from steel rather than cast so as to provide them with strength and durability.

Over the years, the art of forging gears, including ring gears, has advanced to the point where they are able to be "near-net" forged meaning that the teeth are able to be formed to less than about 0.070 inch of the finished dimensions desired for the functional surfaces such as, for example, disclosed in U.S. Pat. No. 4,761,867 assigned to the assignee of the present invention and the disclosure of which is incorporated herein by reference.

Ring gears of the type herein concerned have a plurality of teeth either of the spiral bevel type or hypoid type well know to those skilled in the art that are circumferentially evenly spaced about the central rotational axis of the gear and face in a direction acutely away therefrom. Each tooth features a pair of spaced-apart side walls extending from and following opposite edges of a bottom surface extending therebetween defining a tool path having a median radius of curvature "R" in a plane that is substantially parallel to the bottom surface of the tooth and substantially transverse to the rotational axis of the gear.

Ring gear teeth characteristically have what is known in the trade as Gleason Formate geometry, i.e., a tooth having straight side walls extending angularly away from each other from opposite edges of a bottom surface extending therebetween along a tool path having a median radius of curvature "R" in a plane substantially parallel to the bottom surface and transverse to the rotational axis of the ring gear.

Heretofore, such ring gears have been machined with specialized Gleason equipment having a machining tool featuring formed cutting blades or teeth deployed about and extending transversely from the perimeter of a rotary plate having a diameter of 2R. Although recently improved, such tools have been generally expensive; are difficult to sharpen; are slow in operation; and characteristically require long set-up times.

Ring gears are commonly forged from low to medium carbon and alloy steel such as AISI 8620A, 8622A, 8625A, 8822A, 4817H and 9310A having a carbon content of about 0.05% to about 0.5% by weight. It has also heretofore been standard practice to subject the forged ring gear to normalizing heat treatment or other microstructure modification processes after forging and before machining in order to enhance machinability by promoting more uniform grain size and essentially eliminating Bainitic Ferrite or "Widmanstatten" grain structure adjacent the surface to be machined.

In view of the foregoing, a need has existed for some time to provide a method for machining forged and/or rough-cut ring gear teeth that utilizes conventional equipment, is faster, is less expensive, and eliminates the practice heretofore of normalizing or otherwise modifying the ring gear microstructure prior to machining.

SUMMARY OF THE INVENTION

Accordingly, it is an object of this invention to provide an improved method for machining forged and/or rough-cut teeth of a forged ring gear.

It is another object of this invention to provide an improved method for machining forged and/or rough-cut ring gear teeth that employs conventional equipment and eliminates the practice heretofore of subjecting the ring gear to normalizing heat treatment or other microstructure modification process prior to machining.

It is yet another object of this invention to provide a ring gear made by an improved process by which forged and/or rough-cut teeth of the ring gear are machined.

BRIEF DESCRIPTION OF THE DRAWINGS

FIG. 1 is a cross-sectional view of a vehicular differential utilizing a ring gear 40 made in accordance with the invention;

FIG. 2A is a view of a spiral bevel ring gear taken along view line 2—2 of FIG. 1;

FIG. 2B is a view of a hypoid ring gear 40 taken along view line 2—2 of FIG. 1;

FIG. 3 is a perspective view of one tooth 8 of the ring gear 40 of FIG. 1;

FIG. 4 is a cross-sectional view of ring gear teeth 8 taken along view line 4—4 of FIG. 3;

FIG. 5 is a schematic side view of the prior art method of machining a forged ring gear 40;

FIG. 6 is a schematic side view of the method of the invention for machining forged and/or rough-cut ring gear 40.

DESCRIPTION OF SOME PREFERRED EMBODIMENTS

Figure 7:
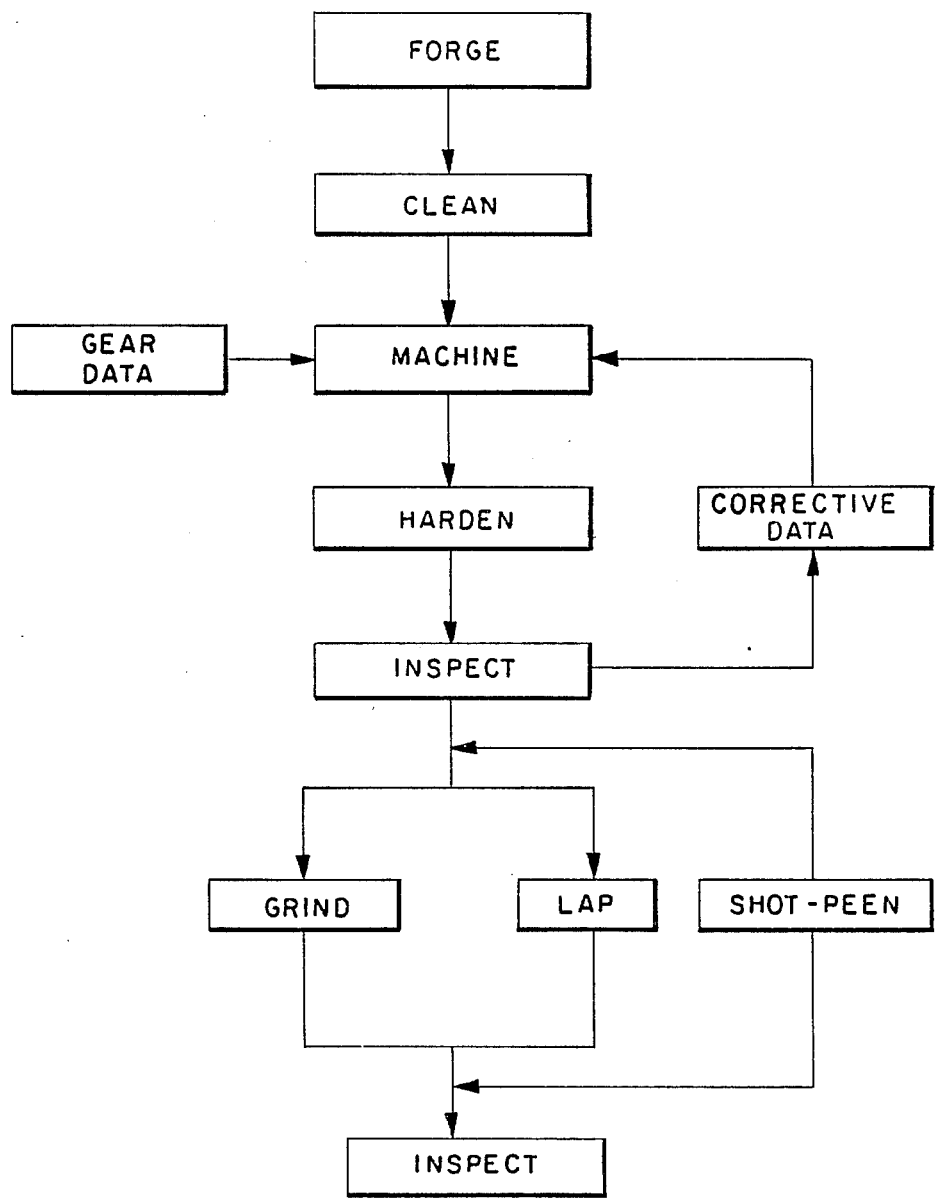
FIG. 7 is a block diagram of an embodiment of the method of the invention for providing a finalized ring gear.

In FIG. 1, ring gear 40 is journaled for rotation on a vehicular differential housing 2 and is drivingly connected to a rotary wheel axle 10 which is drivingly connected to the other wheel axle 17 by means of differential gearing well known to those skilled in the art. Ring gear 40 has a plurality of curved teeth 8 circumferentially evenly spaced about its periphery that are described in greater detail with respect to FIGS. 2A through 4.

Teeth 8 are meshingly engaged with teeth 6 of pinion gear 7 which is rotated by drive shaft 4 which is rotated by the vehicle's power source. As such, ring gears, such as ring gear 40, provide a vital function in transferring torque from a rotating drive shaft such as shaft 4 to rotary wheel axles such as axles 10 and 17.

As shown in FIGS. 2A and 2B, teeth 8 of ring gear 40 are preferably curved as are teeth 6 of pinion gear 7 in order to transfer torque smoothly, quietly and with high efficiency.

In FIG. 2A, ring gear 40 has spiral bevel teeth meshingly engaged with spiral bevel teeth 6 of pinion gear 7 and in FIG. 2B, ring gear 40 has hypoid teeth 8 meshingly engaged with hypoid teeth 6 of pinion gear 7. Ring gear 40 is mounted onto a rotary member (not referenced) of the differential contained within housing 2 by means of plurality of bolts 9 shown in FIG. 1 inserted through openings 21 in ring gear 40 shown in FIGS. 2A and 2B.

The difference between spiral bevel gearing and hypoid gearing is that the central rotational axis 20 of gear 40 transversly intersects central rotational axis 22 of pinion gear 7 in the same plane as shown in FIG. 2A whereas, for hypoid gearing, the rotational axis 22 of pinion gear 7 is offset from the plane in which axis 20 lies by a distance "d" which is commonly from about 1.00 to about 2.00 inches.

Spiral bevel gears tend to provide a more pronounced rolling engagement between each other at the pitch line whereas hypoid gears tend to have a greater degree of sliding relative each other at the pitch line. In recent years, with improvements in gear design and lubrication, sliding contact is not the major problem it once was and hypoid gear sets for heavy duty drive axles have become more acceptable.

Tooth 8 in FIGS. 3 and 4 has a pair of spaced-apart side walls 14,14' that extend angularly away from each other from opposite edges of bottom surface 12 defining a tool path therealong having a median "M" radius of curvature "R" in a plane substantially parallel to surface 12 and substantially transverse to the central rotational axis of ring gear 40.

As shown in FIG. 4, side walls 14 and 14' are preferably straight in a plane substantially transverse to bottom surface 12, yet are curved when viewed in a plane substantially parallel to bottom surface 12. Such curvature is known in the trade as "Gleason Formate" geometry and is commonly employed in ring gear design.

The prior art method of machining ring gears is shown in FIG. 5 in which a cutting tool 30 of a Gleason Formate ring gear machining device is being used to machine tooth 8. The cutting tool body 30 has a circular plate member 16 having an outside diameter somewhat in excess of twice the radius of curvature of tooth 8. A plurality of circumferentially spaced formed cutting bits or blades 18 extend transversely from member 16 about a circular perimeter of member 16 having a diameter of 2R as shown in FIG. 5.

Ring gear 40 of FIG. 5 is a gear having rough-cut or forged, preferably "near-net" forged, teeth 8. Cutting tool 30 is rotated about its rotational axis "C" such that formed bits or cutting blades 18 travel along tooth 8 and machine the sidewall and bottom surface.

Additionally, either tool 30 or ring gear 40 must be tilted relative the other such that their respective rotational axes are inclined a predetermined angle "alpha" relative each other in order to ensure that bits 18 only engage the particular tooth 8 being machined. Ring gear 40 is rotationally indexed to the next tooth after the machining of the preceding tool is completed.

Thus, as previously described, the prior art Gleason Formate ring gear machining equipment involves large circular cutting tools that heretofor have been expensive and require long setup times and are difficult and expensive to sharpen and repair. Gleason equipment further requires swinging of formed cutting bits or blades, a characteristically long distance "R" from the axis of rotation which creates machining problems heretofore virtually mandating that the forged ring gears be subjected to a normalizing heat treatment or other microstructure modification process prior to machining.

Contrary to past and present practice, it has been discovered that a rotary tool can be used to machine forged and/or rough-cut ring gear teeth in the manner shown in FIG. 6 by rotating about a rotational axis "r" that projectionally intersects bottom surface 12 as tool 24 moves along the tool path defining tooth 8 (which may be a curved path having a median radius of curvature "R" as previously described). Although tool 24 may be any type of rotary tool, it is preferably a rotary milling tool and more preferably a rotary carbide milling tool controlled by an automatic milling machine well known to those skilled in the art such as a computer numerically controlled milling machine (CNC) in which predetermined digitalized information can be stored such as on tape for controlling the movement of tool 24.

It is to be understood that, although tool 24 may be cylindrical such as shown in FIG. 6 for machining sidewalls of tooth 8 that are straight when viewed in transverse cross-section to provide Gleason Formate ring gear tooth geometry as previously described, tool 24 may be formed to provide other sidewall shapes such as convoluted side walls. It is to be further understood that although the tool path followed by tool 24 is preferably curved so as to provide either a hypoid or a spiral bevel tooth form, the tool path may be any tool path predetermined to provide the kind tooth engagement described between the ring gear and pinion gear and that tool 24 is further not limited to being a cutting tool, such as a rotary milling tool, but may be a grinding tool whose central rotational axis projectionally intersects the ring gear tool path as herebefore described.

Thus, a rotary tool such as a rotary carbide milling tool can be employed to mill forged and/or rough-cut ring gear teeth that heretofore was thought to be limited exclusively to Gleason type machining equipment. Preferably, the teeth are "near-net" forged such that the rotary tool is required to remove less than about 0.070 inch from the sidewalls of each ring gear tooth.

It has further been discovered that the use of a rotary tool rotating about a rotational axis that projectionally intersects the bottom surface of the tool path places the tool rotational axis closely adjacent the sidewall being machined which essentially eliminates the need for normalizing heat treatment or other microstructure modification process prior to machining to eliminate "Widmanstatten" grain structure and Bainitic Ferrite as previously described.

FIG. 7 shows a preferred embodiment of a method of making a finished ring gear in accordance with the invention in which the most pertinent steps are that the ring gear first be forged, with the teeth preferably "near-net" forged, and then machined with a rotary tool in the manner hereinbefore described, hardened, after which the working surface of the teeth are either finished ground or lapped and then may be shot-peened after grinding or lapping prior to final inspection or, in some instances, before grinding or lapping, such as for example, where the root and side walls of the tooth are first shot-peened afterwhich only the side walls are ground.

More particularly, the method of FIG. 7 further includes cleaning after forging and placing gear design input data into the machine memory system to which corrective inspection data adjustments can be made upon inspection after hardening of the machined ring gear prior to finish grinding or lapping.

The method of FIG. 7 completely eliminates the prior art use of Gleason Formate ring gear machining equipment as well as the prior art practice of having to subject the forged ring gear to any normalizing heat treatment or other microstructure modification process prior to machining.

As previously described, ring gears are characteristically made from suitable alloy steels well known to those skilled in the art. When the steel is a high carbon steel, the ring gear surface can be contour induction hardened between the machining and grinding operations. When the steel is a low carbon steel, the surface of the ring gear can be hardened by standard carburizing procedures well known to those skilled in the art.

What is claimed is:

1. An improved method for machining a forged or ring-cut metallic ring gear tooth having a pair of spaced-apart sidewalls respectively extending from opposite edges of a bottom surface extending therebetween and defining a curved tool path extending therealong having a median radius of curvature "R" in a plane substantially parallel to the bottom surface, said method including the step of machining said tooth by a rotary tool rotating about a central rotational axis "r" that projectionally intersects the bottom surface whilst following the curved tool path therealong.

2. The method of claim 1 wherein the sidewalls are substantially straight and extend from the bottom surface angularly away from each other in a plane substantially transverse to said tool path providing the tooth with a substantially Gleason Formate type geometry.

3. The method of claim 1 wherein the ring gear is made from a metal that has not been normalized at least prior to the machining thereof by the rotary tool.

4. The method of claim 1 wherein the forged ring gear is a near-net forged ring gear.

5. A method for providing a metallic ring gear of the type having a plurality of teeth wherein each tooth has a pair of spaced-apart sidewalls extending from opposite edges of a bottom surface extending therebetween and defining a curved tool path extending therealong having a median radius of curvature "R" in a plane substantially parallel to the bottom surface, said method including the steps of:

(a) forging the ring gear teeth;

(b) machining the forged teeth of step (a) by means of a rotary tool rotating about a central rotational axis "r" that projectionally intersects the bottom surface while following the curved tool path therealong; and (c) at least one of (i) grinding or (ii) lapping the teeth of step (b).

6. The method of claim 5 including the step of shot-peening the teeth before or after step (c).

7. The method of claim 5 wherein the forging of step (a) is near-net forging.

8. The method of claim 5 wherein the ring gear is made from a metal that is not normalized between the forging of step (a) and the machining of step (b).

9. The method of claim 5 wherein the rotary tool of step (b) is adapted to provide the sidewalls with a substantially straight configuration extending from the bottom surface angularly away from each other in a plane substantially transverse to each tool path providing the teeth with a Gleason Formate type geometry.

10. The method of claim 1 or 5 wherein the rotary tool is a rotary milling tool.

11. The method of claim 1 or 5 wherein the rotary tool is a rotary grinding tool.

12. The method of claim 10 wherein the rotary milling tool is a rotary carbide milling tool.

13. A ring gear having teeth respectively having spaced-apart sidewalls respectively extending from opposite edges of a bottom surface extending therebetween and defining a curved tool path extending therealong having a median radius of curvature "R" in a plane substantially parallel to the bottom surface, said teeth having been respectively machined by a rotary tool that rotated about a central rotational axis "r" that projectionally intersected the bottom surface whilst having followed the curved tool path therealong.

14. The ring gear of claim 13 wherein the forged teeth are near-net forged teeth.

15. The ring gear of claim 13 wherein the ring gear is made from a metal that has not been normalized at least prior to being machined by the rotary tool.

16. The ring gear of claim 13 wherein the sidewalls are substantially straight and extend from the bottom surface angularly away from each other in a plane substantially transverse to the tool path providing the teeth with a Gleason Formate type geometry.

17. The ring gear of claim 13 wherein the rotary tool is a rotary milling tool.

18. The ring gear of claim 13 wherein the rotary tool is a rotary grinding tool.

19. The ring gear of claim 17 wherein the rotary milling tool is a rotary carbide milling tool.

* * * * *